Patented May 17, 1938

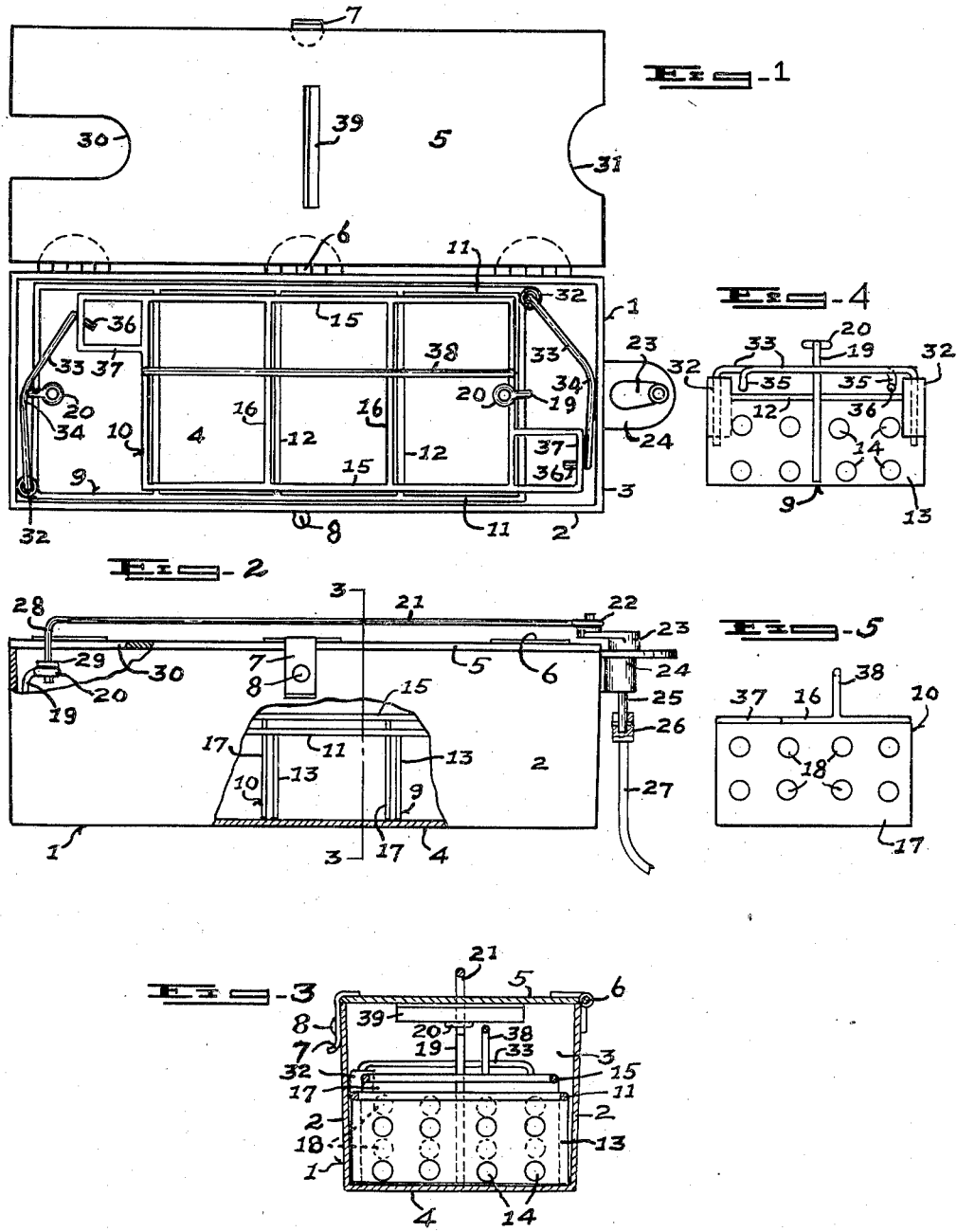

2,117,332

UNITED STATES PATENT OFFICE

2,117,332
ICE CREAM FREEZER

Raymond M. Kaufmann, Pittsburgh, Pa., assignor to Minnie S. Kaufmann, Pittsburgh, Pa.

Application August 16, 1937, Serial No. 159,295

15 Claims. (Cl. 259—112)

This invention relates to an ice cream freezer, and important objects and advantages thereof are to provide an ice cream freezer of the character described, which is primarily intended for family use and designed to be placed in a freezing compartment of an electric refrigerator to effect the freezing process of the cream mixture, which embodies power-operated agitator elements operable to assure the desired uniform consistency of the mixture without crystallization of the latter, which is simple in its construction and arrangement, durable and efficient in its use, compact, sanitary, conveniently employed, and comparatively economical in its manufacture and operation.

To the accomplishment of these and such other objects as may hereinafter appear, the invention consists of the novel construction, combination and arrangement of parts herein specifically described and illustrated in the accompanying drawing, but it is to be understood that changes in the form, proportions and details of construction may be resorted to that come within the scope of the claims hereunto appended.

In the drawing wherein like numerals of reference designate corresponding parts throughout the several views:

Figure 1 is a top plan view of an ice cream freezer, constructed in accordance with the invention, with the cover thereof in the open position.

Figure 2 is a side elevational view of the device, partly in cross section.

Figure 3 is a transverse sectional view on line 3—3, Figure 2.

Figures 4 and 5 are respective end views of the agitator elements.

Referring in detail to the drawing, 1 denotes an oblong, rectangularly-shaped pan or receptacle preferably having slightly tapering side and end walls 2 and 3 to diminish the size thereof toward its bottom 4.

The receptacle has a top cover 5, which is connected to the former by hinges 6. The cover is provided with a resilient, apertured latch 7 engaging a head 8, fixed in the receptacle side wall, for securing the cover in the closed position.

A lower agitator element 9 and an upper agitator element 10 are mounted in the receptacle 1, and are reciprocally shiftable in the longitudinal direction in the latter, for agitating the cream mixture during the freezing process.

The lower agitator element 9 comprises an integral, rectangularly-shaped frame consisting of a pair of side members 11 which are joined by a plurality of regularly spaced transverse members 12. Each of the latter carries a fixed, depending baffle plate 13, which extends transversely and is provided with a plurality of perforations 14. The latter are arranged to provide two transversely aligned rows.

The upper agitator element 10 comprises an integral, rectangularly-shaped frame consisting of a pair of side members 15 and a plurality of regularly spaced transverse members 16 joined with the latter. Each of the members 16 carries a fixed, depending baffle plate 17 provided with two rows of perforations 18.

The baffle plates 13 and 17 are rectangularly-shaped, and when the agitator elements 9 and 10 are mounted in the receptacle 1, the lower edges of said baffle plates will rest squarely upon the bottom 4. The baffle plates 17 are shorter but somewhat higher than the baffle plates 13, whereby the frame of the upper element 10 is spaced from and disposed above the frame of the lower element 9. The baffle plates 13 of the latter are of lengths approximating the width of the receptacle.

In positioning the agitator elements 9 and 10 in the receptacle 1, the lower agitator element 9 is first placed in the latter. The upper agitator element 10 is then placed on top of the lower element. The shorter lengths of the baffle plates 17 allow the latter to pass between the side members 11 of the frame of the lower element 9.

When the pair of agitator elements 9 and 10 is mounted in position in the receptacle 1, a baffle plate 17 of the element 10 will be disposed between each adjacent pair of baffle plates 13 of the lower element 9. All of the baffle plates are positioned parallel to each other, and the two rows of perforations 18 in the upper element 10 are positioned higher than the two corresponding rows of perforations 14 in the plates 13 to augment the agitation of the cream mixture when the plates 13 and 17 are drawn through the latter during the operation of the device.

Each end of the lower agitator element 9 is provided with a centrally disposed, vertically extending support 19, which is fixed in position and carries a fixed connecting eye 20 at the upper end thereof. The supports 19 project above the agitator elements to position the connecting eyes 20 adjacent to the open top of the receptacle 1.

A connecting rod 21 is disposed outwardly of the receptacle cover 5 and extends horizontally in the longitudinal direction. One end of the connecting rod is provided with a connecting eye 22, which is pivotally and removably engaged on a crank arm 23. The latter is suitably journaled for rotation in a bearing bracket 24, fixed at one end of the receptacle 1, and includes a pivot pin 25 adapted for connection, by a coupling 26, with a flexible shaft 27 operated by the prime mover in the form of a small electric motor.

The other end of the connecting rod 21 is formed with a depending portion 28 carrying a fixed seating collar 29. The depending portion 28 extends through a large recess 30 formed in one end of the cover 5, and is pivotally and removably engaged in the connecting eye 20 that is disposed remotely with respect to the position of the crank arm 23. It will be apparent that, the rotation of the crank arm 23 will impart longitudinal reciprocal movement to the connecting rod 21 and like movement to the lower agitator element 9.

The connecting rod 21 may be readily connected to the crank arm 23 and to the connecting eye 20, and likewise may be conveniently removed or disconnected from said crank arm and connecting eye. A recess 31 is provided in the end of the cover 5 adjacent to the crank arm to clear the latter at any position when the cover is shifted to the open or closed position.

The lower agitator element 9 is provided with a pair of vertically extending bearings 32, which are disposed at the top of respective diagonally opposed corners of said lower agitator element.

An angular actuating arm 33 is pivotally connected in each of the bearings 32. The apexes of the angles 34, of the actuating arms 33, are disposed toward and are in contact with respective end walls 3 when the agitator elements 9 and 10 are mounted in position in the receptacle 1.

The free ends of the actuating arms 33, are provided with depending fingers 35 and lips 36 for engaging fixed longitudinal extensions 37, which latter are carried at respective diagonally opposed corners of the upper agitator element 10. The function of the actuating arms is to impart longitudinal reciprocal movement to the upper agitator element, when like movement is imparted to the lower agitator element 9 by the operation of the crank arm 23.

It will here be noted that, the longitudinal reciprocal movements of the upper and lower agitator elements are in opposite directions relatively to each other, whereby the baffle plates 13 and 17, of respective agitator elements 9 and 10, will alternately shift toward and away from each other during the operation of the device. The distances between the baffle plates 13 are approximately the same as the distances between the baffle plates 17, so that at the end of each reciprocal movement the baffle plates 13 will be positioned in close proximity to respective baffle plates 17, and the end baffle plates 13 will also alternately shift into close proximity to respective end walls 3 of the receptacle 1.

A longitudinally extending holding rod 38 is fixed to the top of the upper agitator element 10, and is disposed above the latter to be engaged by an elongated retaining bar 39, which extends transversely and is fixed against the under side of the receptacle cover 5. The holding rod 38 is laterally offset from the longitudinal center of the upper agitating element so as not to interfere with the operation of the centrally disposed connecting rod 21.

The retaining bar 39 will be engaged by the holding rod 38, to maintain the upper agitator element 10 against the receptacle bottom 4, only when the congealing consistency of the cream mixture tends to elevate the upper agitator element in the receptacle 1. The lower agitator element 9 will also be maintained against the receptacle bottom by the engagement of the lips 36, which engage the under sides of the extensions 37 carried by the upper agitator element.

Due to the length of the retaining bar 39, and by providing a supported connecting eye 20 at each end of the lower agitator element 9, the pair of agitator elements may be positioned to extend in either direction in the receptacle 1. Further, the provision and elevated positions of the pair of connecting eyes 20 allow the latter to be employed as handholds for facilitating the lifting of the pair of agitator elements 9 and 10 from the receptacle upon completing the freezing operation, or at any other time required.

During the operation of my improved freezer, the lower edges of the baffle plates 13 and 17 will scrape continuously upon the receptacle bottom 4, and the cream mixture will be agitated constantly and effectively, to produce a superior finished product free from all crystallized particles, and of uniform smoothness and consistency throughout its mass.

What I claim is:

1. An ice cream freezer comprising, the combination of a receptacle for receiving the cream mixture, a lower and an upper agitator element mounted for reciprocal movement in said receptacle, a plurality of perforated baffle plates carried by each of said elements, power-operated means for imparting reciprocal movement to said lower element, means carried by said lower element and engaging said upper element for imparting reciprocal movements to the latter in directions opposite to the reciprocal movements of said lower element, and means for maintaining said baffle plates in contact with the bottom of said receptacle.

2. An ice cream freezer comprising a receptacle, a pair of separate agitator elements mounted on and supported by the bottom of said receptacle to shift reciprocally in said receptacle, power operated means for imparting reciprocal movement to one of said elements, and means disposed in relation to said elements and actuated by the reciprocal movements of one of said elements for imparting reciprocal movement to the other of said elements.

3. An ice cream freezer comprising a receptacle, a pair of separate agitator elements mounted on and supported by the bottom of said receptacle to shift reciprocally in said receptacle, power operated means for imparting reciprocal movement to one of said elements, and means disposed in relation to said elements and actuated by the reciprocal movements of one of said elements for imparting opposite reciprocal movements to the other of said elements.

4. An ice cream freezer comprising a receptacle, a pair of agitator elements mounted on and supported by the bottom of said receptacle to shift reciprocally in said receptacle, power operated means for imparting reciprocal movement to one of said elements, and means disposed in relation to said elements and actuated by the reciprocal movements of said power operated element for imparting reciprocal movement to the other of said elements in directions opposed to the reciprocal movements of said power operated element.

5. An ice cream freezer comprising a receptacle, a pair of separate agitator elements mounted on and supported by the bottom of said receptacle to shift reciprocally in said receptacle, power operated means for imparting reciprocal movement to one of said elements, and means carried by one of said elements and actuated by the reciprocal movements of said power operated element for imparting reciprocal movement to the other of said elements.

6. An ice cream freezer comprising a receptacle, a pair of separate agitator elements mounted on and supported by the bottom of said receptacle to shift reciprocally in said receptacle, power operated means for imparting reciprocal movement to one of said elements, and means connected with one of said elements and actuated by the reciprocal movements of said power operated element for imparting opposed reciprocal movements to the other of said elements.

7. An ice cream freezer comprising a receptacle, a pair of separate agitator elements mounted on and supported by the bottom of said receptacle to shift reciprocally in said receptacle, power operated means for imparting reciprocal movement to one of said elements, and means disposed in relation to said elements and actuated by the reciprocal movements of said power operated element for imparting reciprocal movement to the other of said elements, one of said elements being removable from said receptacle without disturbing the position of the other of said elements in said receptacle.

8. An ice cream freezer comprising a receptacle, a pair of separate agitator elements mounted on and supported by the bottom of said receptacle to shift reciprocally in said receptacle, a plurality of baffle plates carried by each of said elements, power operated means for imparting reciprocal movement to one of said elements, and means carried by one of said elements and actuated by the movements of said power operated element for shifting the baffle plates of one of said elements toward the baffle plates of the other of said elements.

9. An ice cream freezer comprising a receptacle, a pair of separate agitator elements mounted on and supported by the bottom of said receptacle to shift reciprocally in said receptacle, power operated means for imparting reciprocal movement to one of said elements, operating means carried by one of said elements and co-acting with both of said elements, said operating means reciprocating in a direction opposite to the direction of the movement of the element carrying said operating means to impart movement to the non-power operated element.

10. An ice cream freezer comprising a receptacle, a pair of separate agitator elements mounted for reciprocal movement in said receptacle, power operated means for imparting reciprocal movement to one of said elements, and a pair of members actuated by the movements of said power operated element, one of said members imparting movement to the non-power operated element in one direction, and the other of said members imparting movement to the non-power operated element in the other direction.

11. An ice cream freezer comprising a receptacle, a pair of separate agitator elements mounted on and supported by the bottom of said receptacle to shift reciprocally in said receptacle, power operated means for imparting reciprocal movement to one of said elements, and means driven in one direction by said power operated element and shifting in the other direction to impart movement to the non-power operated element.

12. An ice cream freezer comprising a receptacle for receiving the mixture, a lower agitator element, an upper agitator element, said elements being mounted on and supported by the bottom of said receptacle and reciprocally shiftable on the bottom of the latter, power-operated means for imparting reciprocal movement to one of said elements, and means carried by one of said elements for imparting reciprocal movement to the non-power operated element.

13. In an ice cream freezer, a receptacle for receiving the mixture, a pair of separate agitator elements mounted on and supported by the bottom of said receptacle for reciprocal movement in the latter, power operated means for imparting reciprocal movement to one of said pair of elements, and actuating means connected with one of said pair of elements for imparting movement to the non-power operated element in one direction only.

14. In an ice cream freezer, a receptacle, a pair of separate agitator elements mounted on and supported by the bottom of said receptacle for reciprocal movement in the latter, one of said pair of elements being power driven, and a pair of actuating members carried at respective opposite ends of one of said elements operated by said power driven element to impart reciprocal movement to the non-power driven element.

15. In an ice cream freezer, the combination of a receptacle for receiving the cream mixture, an upper and a lower agitator element mounted for reciprocal movement in said receptacle, power operated means for imparting reciprocal movement to one of said elements, and means carried by one of said elements operable for imparting reciprocal movement to the non-power operated element.

RAYMOND M. KAUFMANN.